3,554,973
MODIFYING HALOGENATED CYCLOALKENYL KETONE CONTAINING ALPHA OLEFIN POLYMERS
Eiichi Morita, St. Albans, W. Va., assignor to Monsanto Company, St. Louis, Mo., a corporation of Delaware
No Drawing. Continuation-in-part of applications Ser. No. 308,324, Sept. 12, 1963, and Ser. No. 407,869, Oct. 10, 1964. This application July 24, 1967, Ser. No. 655,319
Int. Cl. C08f 27/03, 27/04, 27/07
U.S. Cl. 260—66                          29 Claims

ABSTRACT OF THE DISCLOSURE

Polymers are modified or vulcanized with halogenated cycloalkenyl ketone comprising at least one six-membered carbocyclic unsaturated ring containing a single keto substituent and a plurality of halogen substituents. The polymers include saturated plastic polymers derived from an alpha olefin, diene rubbers, silicone rubber, and polyurethane rubbers. Auxiliary agents which may be present include sulfur, basic metal compound, hydroquinone, and quinone compounds.

---

This application is a continuation-in-part of application Ser. No. 308,324, filed Sept. 12, 1963, now abandoned, and of application Ser. No. 407,869, filed Oct. 10, 1964, now abandoned.

The present invention relates to modifying polymers, for example, olefin polymers. It particularly relates to modifying synthetic rubbery copolymers of alpha olefins so as to render them reactive with vulcanizing agents and to vulcanizing such copolymers. The invention provides new agents for modifying and new agents for vulcanizing or cross linking olefin polymers.

Synthetic rubbery copolymers of ethylene and propylene have been developed in recent years. Although these elastomers are economical to produce, they are difficult to vulcanize because of their saturated nature. For this reason various means have been sought to improve vulcanization either by increasing vulcanizability of the elastomer through introduction of reactive sites into the polymer structure or through discovery of more effective vulcanizing agents. Although organic peroxides effect cross linking of ethylene-propylene copolymer rubber, they are expensive and hazardous to use and the vulcanizates are deficient in certain physical properties.

In accordance with the present invention it has been discovered that halogenated cycloalkenyl ketones are effective modifying and vulcanizing agents. More particularly, halogenated alkenyl ketones, wherein the halogen is chlorine or bromine and in which the ratio of the number of halogen atoms to the number of ring carbon atoms is preferably at least one, effect desirable modification of olefin polymers. These compounds convert the polymer into processable reactive polymers vulcanizable with sulfur or in combination with suitable auxiliary agents like sulfur convert the polymer to a fully vulcanized condition. Suitable compounds have been described in the laterature and in general may be made by halogenating the corresponding phenol whereby the hydroxy radical is converted to a keto radical and the aromatic character is altered by saturation of some of the double bonds, although some unsaturation is permitted to remain.

The preferred polymers utilized in this invention are the low-pressure, substantially amorphous (having less than about 15% by weight crystallinity) coploymers of ethylene and other alpha olefins. However, reactive polymers and vulcanizates can be produced from any of the normally solid saturated plastic polymers of styrene and alpha olefins up to about six carbon atoms including atactic, isotactic, crystalline, or amorphous polymers of alpha olefins, as for example polyisobutylene, polypropylene, polyethylene, and polystyrene. Other monoolefins from which the saturated polymers may be derived include butene-1, pentene-1, hexene-1, and 4-methyl-pentene-1. Copolymers containing from about 20 mole percent to 90 mole percent of ethylene units in the copolymer with propylene yield desirable elastomers. A still more preferred range for optimum elastomeric properties is 40 to 75 percent by weight of ethylene.

As typical examples of the new modifying and vulcanizing agents, there may be mentioned:

3-methyl-2,4,4,6-tetrachloro-2,5-cyclohexadien-1-one
4-methyl-2,3,4,6-tetrachloro-2,5-cyclohexadien-1-one
2,2,4,5,6,6-hexachloro-3-methyl-3-cyclohexen-1-one
3,4,4,5,6,6-hexachloro-2-methyl-2-cyclohexen-1-one
2,6-dimethyl-3,4,4,5,6-pentachloro-2-cyclohexen-1-one
3,5-dimethyl-2,4,4,6-tetrachloro-2,5-cyclohexadien-1-one
3,6-dimethyl-2,2,4,5,6-pentachloro-3-cyclohexen-1-one
2,3,4,4,5,6,6-heptachloro-2-cyclohexen-1-one
2,3,4,4,5,6-hexachloro-2,5-cyclohexadien-1-one
2,3,4,5,6,6-hexachloro-2,4-cyclohexadien-1-one
2,2,3,4,5,5,6,6-octachloro-3-cyclohexen-1-one
2,3,4,4,5,5,6,6-octachloro-2-cyclohexen-1-one
2,2,3,4,5,5,6,6-octabromo-3-cyclohexen-1-one
decabromobicyclohexadienone
decachlorobicyclohexadienone as for example
  1,2,3,5,6,1′,2′,3′,5′,6′-dechachloro-4,4′-bicyclohexadienone, and
2,3,4,5,6-pentachloro-4-pentachlorophenoxy-2,5-cyclohexadienone Chlorocyclopentenones are valuable coagents of vulcanization, examples of which are:

2,2,3,4,5,5-hexachloro-3-cyclopenten-1-one
2,3,4,4,5,5-hexachloro-2-cyclopenten-1-one, and
2,3,4,4,5,5-hexabromo-2-cyclopenten-1-one.

The preferred practice when the haloketones are used as vulcanizing agents is to carry out the vulcanizing process in the presence of 0.5 to 3.0 parts sulfur per 100 parts solid olefin polymer. On the other hand, cures are effected without sulfur providing magnesium oxide is present.

In the practice of the invention extenders and fillers may be incorporated into the polymers. Carbon blacks are customarily incorporated to increase the strength of the vulcanizate in a manner analogous to the well-known practice of reinforcing natural rubber. For the preparation of stocks containing carbon black, it is desirable to incorporate the black before adding the vulcanizing agent. Also, in compounding and vulcanizing black stocks the presence of both sulfur and suitable metal compound is desirable. The metal compound need not necessarily be an oxide, although metal oxides are preferred. In general, basic metal compounds, or in other words metal compounds formed from weak acids, for example carbonates and hydroxides, are suitable. Magnesium sulfate exerted only a weak effect. Suitable metals comprise Mg, Ca, Zn, Sr, Cd, Ba, Hg, Al, Sn, Pb, Fe, Co, and Ni. However, divalent metals are preferred.

The vulcanizing process may be carried out at 200° F. or even lower, but lower temperatures prolong the reaction time beyond the limits tolerated in commercial practice. In general, vulcanization is preferably carried out in the range of 200° F. to 350° F. (about 93°–177° C.).

A suitable ketone may be prepared by chlorinating Bisphenol A, 2,2′-bis(p-hydroxyphenyl)propane. Chlorination is carried out in glacial acetic acid at 45° to 75° C. The oil layer is separated, washed with water, extracted with ether, and the ether removed to yield as a residue a yellow oil. Infrared analysis shows a strong ketone band. Isolation of a single pure component is unnecessary for practice of the present invention.

Decachlorobicyclohexadienone is conveniently prepared by chlorination of dihydroxyoctachlorobiphenyl. The latter in turn is prepared by charging 13.8 pounds of decachlorobiphenyl to an autoclave, adding 4.5 pounds of NaOH dissolved in methanol, and heating at 165° to 180° C. The autoclave is heated for two hours with agitation. The thick paste remaining as a residue is redissolved in water and the free phenol is precipitated from the sodium salt solution by hydrochloric acid, filtered, washed thoroughly with water and dried. The dried product is suspended in water and chlorine passed through the suspension. After 30 minutes a bright yellow solid forms, melting point 144° to 150° C. Infrared analysis confirms the presence of diketo structure and molecular weight conforms to that calculated for decachlorobicyclohexadienone.

As an example of the invention there is added 0.05 gram (5 parts per 100 of rubber) of vulcanizing agent together with zinc oxide and sulfur to a 6.5% solution of ethylene-propylene copolymer rubber (Enjay EPR 404— 43% ethylene by weight) in benzene. The ingredients are mixed thoroughly and a thin layer of the mixture poured on a glass plate. The film is dried four hours, then stripped from the glass, folded, and heated in a press 40 minutes at 160° C. The final compositions are as follows:

| | Parts by weight |
|---|---|
| EP rubber | 100 |
| Zinc oxide | 2 |
| Sulfur | 1 |
| Vulcanizing agent | 5 |

The state of cure is evaluated by determining the proportion of the cured product soluble in benzene. Without vulcanizing agent the product is completely soluble.

| Vulcanizing agent: | Soluble fraction, percent avg. |
|---|---|
| 2,3,4,4,5,6 - hexachloro - 2,5-cyclohexadien-1-one | 14.5 |
| Decachlorobicyclohexadienone | 17.0 |

As illustrative of the effect of metal oxides, stocks are compounded comprising:

| | Parts by weight |
|---|---|
| EP rubber | 100 |
| Metal oxide | 2 |
| Sulfur | 1 |
| Vulcanizing agent | 5 |

As before, the compositions are heated 40 minutes at 160° C. and the percent soluble in benzene determined. The results below demonstrate that a variety of metal oxides are utilizable in the process.

| | Percent soluble | |
|---|---|---|
| | 2,3,4,4,5,6-hexachloro-2,5-cyclohexadien-1-one | 2,2,3,4,5,5,6,6-octachloro-3-cyclohexen-1-one |
| Metal oxide: | | |
| MgO | 11.8 | 10.4 |
| CaO | 11.1 | 10.6 |
| CdO | 17.0 | 10.8 |
| Cu$_2$O | 18.9 | 13.0 |
| CuO | | 22.7 |
| ZnO | 15.5 | 21.6 |
| PbO | 20.3 | 16.4 |
| PbO$_2$ | | 16.3 |
| SnO$_2$ | | 24.0 |

Employing as the vulcanizing agent 2,2,3,4,5,5,6,6-octachloro-3-cyclohexen-1-one in the foregoing formulation and replacing the metal oxides with other metal compounds the following results are obtained:

| Metal compound— | Sol. fraction, percent |
|---|---|
| MgCO$_3$ | 11.5 |
| CaCO$_3$ | 15.7 |
| Ca(OH)$_2$ | 9.0 |
| CaS | 12.2 |
| Ca stearate | 16.1 |
| BaCO$_3$ | 22.1 |
| MnCO$_3$ | 12.3 |
| CoCO$_3$ | 13.5 |
| NiCO$_3$·3Ni(OH)$_2$·4H$_2$O | 16.2 |

As illustrative of results obtained in black stocks, ethylene-propylene copolymer rubber containing 43% ethylene by weight (100 parts) is mixed with high abrasion furnace carbon black (50 parts) in a Banbury mixer. The vulcanizing agent, magnesium oxide, and sulfur are then added on a rubber mill and the compositions cured by heating 40 minutes in a press at 160° C. The excellent cures are demonstrated by the high strength of the vulcanizates

| Parts per hundred | | | Modulus of elasticity in lbs./in.$^2$ at 300% elongation | Tensile at break-in., lbs/in.$^2$ | Ultimate elongation, percent |
|---|---|---|---|---|---|
| Vulcanizing agent[1] | MgO | S | | | |
| 5 | 2 | 1 | 240 | 1,260 | 680 |
| 5 | 5 | 1 | 250 | 1,330 | 670 |
| 5 | 10 | 1 | 350 | 1,570 | 630 |
| 7.5 | 2 | 1 | 640 | 1,520 | 500 |
| 7.5 | 5 | 1 | 830 | 2,000 | 530 |
| 7.5 | 10 | 1 | 870 | 2,010 | 480 |
| 7.5 | 2 | 2 | 640 | 1,720 | 500 |
| 7.5 | 5 | 2 | 830 | 2,160 | 550 |
| 7.5 | 10 | 2 | 1,000 | 2,250 | 530 |
| 10 | 2 | 1 | 870 | 1,920 | 500 |
| 10 | 5 | 1 | 1,080 | 2,230 | 490 |
| 10 | 10 | 1 | 1,330 | 2,470 | 480 |

[1] 2,2,3,4,5,5,6,6-Octachloro-3-cyclohexen-1-one.

As illustrative of the use of other halogenated cycloalkenyl ketones to cross link saturated rubber, ethylene-propylene copolymer rubber containing 43% ethylene by weight is mixed with high abrasion furnace black in a Banbury mixer followed by addition of other ingredients on a rubber mill. Vulcanizable stocks are compounded comprising:

| | Parts by weight |
|---|---|
| EP rubber | 100 |
| Carbon black | 50 |
| Magnesium oxide | 10 |
| Sulfur | 1 |
| Vulcanizing agent | 10 |

Vulcanizing agents are as follows:

A—2,3,4,4,5,5,6,6-octachloro-2-cyclohexen-1-one
B—Chloroketone prepared by chlorinating Bisphenol A
C—Chloroketone prepared by chlorinating 2,2'-thiobis-(4,6-dichlorophenol)
D—Chloroketone prepared by chlorinating dichlorophenol formaldehyde resin
E—3-methyl-2,4,4,6-tetrachloro-2,5-cyclohexadien-1-one
F—2,2,4,5,6,6-hexachloro-3-methyl-3-cyclohexen-1-one
G—Chloroketone prepared by chlorinating nonylphenol
H—Chloroketone prepared by chlorinating butylphenol
J—2,2,3,4,5,6-hexachloro-6-methyl-3-cyclohexen-1-one
K—Liquid chloroketone prepared by chlorinating o-cresol
L—3,5-dimethyl-2,4,4,6-tetrachloro-2,5-cyclohexadien-1-one The compositions are cured by heating in a press for 40 minutes at 160° C. to obtain the modulus and tensile properties set forth below:

| | Modulus of elasticity in lbs./in.² at 300% elongation | Tensile at break-in, lbs./in.² | Ultimate elongation, percent |
|---|---|---|---|
| Vulcanizing agent: | | | |
| A | 1,430 | 2,370 | 410 |
| B | 880 | 2,400 | 620 |
| C | 420 | 1,700 | 750 |
| D | 210 | 1,400 | 990 |
| E | 490 | 1,700 | 650 |
| F | 930 | 1,900 | 500 |
| G | 230 | 1,100 | 880 |
| H | 330 | 1,400 | 740 |
| J | 640 | 1,800 | 620 |
| K | 330 | 1,200 | 800 |
| L | 750 | 1,800 | 530 |

Vulcanizing agents B, C, and D impart to the green compounded stocks tack which is normally lacking in EPR black stocks without tackifiers. Although the vulcanizing agents sometimes show a surface bloom, none is observed on the stocks containing Agents E, G, H, J and K. The bloom observed on vulcanizates cured with 2,2,3,4,5,5,6,6-octachloro-3-cyclohexen-1-one, hereinafter designated Vulcanizing Agent M, is prevented by curing with equal parts by weight of M and E, G, H, J, or K. Vulcanizing Agent J is a solid hexachloroketone prepared by the chlorination of o-cresol, probably 2,2,3,4,5,6-hexachloro-6-methyl-3-cyclohexen-1-one, which provides an effective nonblooming vulcanizing agent when a high degree of processing safety is required.

Curing at various times at 150° C. reveals considerable variation in the time to optimum cure, thus providing a wide selection to fit the particular purpose of the compounder. The above-described composition containing Agents F, J and L reach optimum cure at 150° C. in the times indicated below. The same composition was used to evaluate Agent M. Cure time is also evaluated by means of the Monsanto Oscillating Disk Rheometer described by Decker et al., Rubber World, December, 1962. See, also, Chemical and Engineering News, May 13, 1963. From the Rheometer cure curves, the time to reach 95% cure is noted:

| | Cure time in minutes | Modulus of elasticity in lbs./in.² at 300% elonagtion | Tensile at break- in, lbs./in.² | Ultimate elongation, percent | Minutes to 95% cure |
|---|---|---|---|---|---|
| Vulcanizing agent: | | | | | |
| F | 40 | 750 | 1,940 | 570 | 27 |
| J | 100 | 580 | 1,600 | 640 | 98 |
| L | 20 | 500 | 1,860 | 770 | 26 |
| M | 60 | 630 | 1,380 | 570 | 60 |

For some purposes it is advantageous to replace magnesium oxide with magnesium hydroxide. Replacing magnesium oxide with an equal weight of magnesium hydroxide in the composition with Agent M and curing 40 minutes at 160° C. produces a vulcanizate which possesses a modulus at 300% elongation of 1630 lbs. per square inch, tensile strength at break of 2700 lbs. per square inch, and ultimate elongation of 450%. Considerable variation in results is noticeable from different commercial magnesium oxides, but this variation is reduced or eliminated by replacing part of the magnesium oxide with magnesium hydroxide.

Further examples of the vulcanizing agents are illustrated by compounding stocks employing the aforesaid composition of:

| | Parts by weight |
|---|---|
| EP rubber | 100 |
| Carbon black | 50 |
| Magnesium oxide | 10 |
| Vulcanizing agent | 10 |
| Sulfur | 1 |

The vulcanizing agents are:

N—Chlorinated 2,5-xylenol containing 61% chlorine
O—Chlorinated 2,4-xylenol containing 55% chlorine
P—Chlorinated 2,3-xylenol, M.P. 77.5°–79° C.

These stocks are cured by heating 120 minutes at 153° C. in a press. The modulus and tensile properties are as follows:

| | Vulcanizing agent | Modulus of elasticity in lbs./in.² at 300% elongation | Tensile at break-in, lbs./in.² | Ultimate elongation, percent |
|---|---|---|---|---|
| Stock: | | | | |
| N | 10 | 770 | 2,100 | 650 |
| O | 10 | 270 | 900 | 980 |
| P | 10 | 800 | 2,100 | 630 |

As illustrative of the effect with polypropylene, stocks are compounded comprising:

| | Stocks | | |
|---|---|---|---|
| | A | B | C |
| Polypropylene | 100 | 100 | 100 |
| Carbon black | 50 | 50 | 50 |
| Magnesium oxide | | 4 | 4 |
| Vulcanizing agent M | | 4 | 4 |
| Sulfur | | | 1 |

The compositions are heated for 60 minutes at 180° C. in a press and the vulcanizing efficiency measured by heating 26 hours in xylene at 110° C. and determining the percent by weight of the original composition which dissolved.

Stock: Percent soluble
A _____ 25.2
B _____ 0.3
C _____ 0.0

Similar tests are carried out employing compositions comprising:

| | Stocks | | | |
|---|---|---|---|---|
| | D | E | F | G |
| Polyolefin | 100 | 100 | 100 | 100 |
| Carbon black | 50 | 50 | 50 | 50 |
| Magnesium oxide | 4 | 0 | 8 | 0 |
| Vulcanizing agent J | 4 | 4 | 8 | 8 |
| Sulfur | 1 | 1 | 1 | 1 |
| Magnesium hydroxide | 0 | 4 | 0 | 8 |

The polypropylene compositions are treated as described above. The polyethylene compositions are cured by heating 60 minutes at 150° C. and the percent soluble determined after heating 26 hours in xylene at 110° C. The results are compared to the control stocks comprising 100 parts by weight of polyolefin admixed with 50 parts by weight of carbon black which, in the case of polypropylene, is Stock A above.

|  | Percent soluble ||
| --- | --- | --- |
|  | Polypropylene | Polyethylene |
| Stock: |  |  |
| Control | 25.2 | 52.3 |
| D | 2.8 | 17.6 |
| F | 7.8 | 8.9 |
| E | 4.9 | 12.1 |
| G | 7.9 | 7.6 |

Admixtures of polyethylene or polypropylene with EPR can, of course, be covulcanized by the new process. Replacing 40% of the EPR by polyethylene provides a particularly desirable combination. A formula of Polymers 100, Carbon black 50, Magnesium oxide 10, Vulcanizing Agent M 10, and Sulfur 1, parts by weight, is cured by heating 30 minutes at 160° C. and the modulus and tensile properties determined with results as follows:

| EPR replaced by polyethylene, percent | Modulus of elasticity in lbs./in.$^2$ at 300% elongation | Tensile at break-in, lbs./in.$^2$ | Ultimate elongation, percent |
| --- | --- | --- | --- |
| None | 670 | 1,120 | 500 |
| 10 | 640 | 1,020 | 550 |
| 20 | 810 | 1,200 | 540 |
| 40 | 1,300 | 1,780 | 500 |

Although the vulcanizing agents for this invention are particularly valuable for curing rubbers which are essentially saturated, they cure rubbers of high functionality like natural rubber and styrene butadiene copolymer rubber and rubbers of low functionality like butyl rubber, a copolymer of isobutylene and a small proportion—not more than about 15%—of a conjugated diolefin and ethylene-propylene terpolymer rubber. Ethylene-propylene terpolymer rubber (EPT) contains a small proportion of a diene, usually nonconjugated, which contributes unsaturation. Reactive rates of halocycloalkenyl ketones with highly unsaturated rubbers and with saturated rubbers are too divergent for effective covulcanization. However, effective use of the new vulcanizing system with rubbers of low functionality is achieved by blending EP rubber with a small amount, up to about 25%, of rubber of low functionality. Variations in the ratio of EP and EPT rubber show that cross-linking efficiency increases linearly as the amount of terpolymer displacing copolymer increases. Tensile strengths follow approximately the same linear relation. However, increasing terpolymer ratio is accompanied by decreasing processing safety. Considerable improvement in properties with reasonable processing safety is achieved by blending EP rubber with a small proportion of EPT rubber or butyl rubber and vulcanizing with the new system. Vulcanization of butyl rubber compared to conventional curing systems, both cured 60 minutes at 153° C., is illustrative below:

|  | Parts by weight ||
| --- | --- | --- |
|  | Conventional | Invention |
| Butyl rubber | 100 | 100 |
| Carbon black | 50 | 50 |
| Stearic acid | 1 |  |
| Hydrocarbon processing aid | 10 |  |
| Magneisum oxide |  | 5 |
| 2,2'-dithiobis(benzothiazole) | 1.0 |  |
| Tellurium diethyldithiocarbamate | 1.0 |  |
| Sulfur | 0.75 | 1.0 |
| Vulcanizing Agent M |  | 5 |
| Modulus of elasticity in lbs./in.$^2$ at 300% elongation | 730 | 1,160 |
| Tensile strength at break-in, lbs./in.$^2$ | 2,730 | 2,440 |
| Ultimate elongation, percent | 660 | 560 |

Covulcanizing mixtures of EP rubber and EPT rubber with a chloroketone is illustrated with a formulation comprising:

|  | Parts by weight |
| --- | --- |
| Rubber or mixture thereof | 100 |
| Carbon black | 50 |
| Sulfur | 1.5 |
| Magnesium oxide | 10 |
| Vulcanizing agent M | 10 |

Curing 40 minutes at 150° C. produces vulcanizates having properties as follows:

|  | Rubber ||||||
| --- | --- | --- | --- | --- | --- | --- |
|  | EP | EP/EPT, 90/10 | EP/EPT, 75/25 | EP/EPT, 50/50 | EP/EPT, 25/75 | EPT |
| Modulus of elasticity at 300% elongation in lbs./in.$^2$ | 820 | 1,100 | 1,450 | 2,070 | 2,350 |  |
| Tensile at break-in, lbs./in.$^2$ | 1,900 | 1,820 | 2,150 | 2,550 | 2,740 | 2,500 |
| Ultimate elongation, percent | 590 | 480 | 420 | 300 | 340 | 270 |

The new adjuvants have one keto group per ring. Compounds containing a second keto substituent whether halogenated or not impart desirable improvements when used in conjunction with a halogenated cycloalkenyl ketone. Resistance to oxidation of the vulcanizates is enhanced by the presence of various cyclic unsaturated diketones, or quinones. Amine and phenolic antioxidants conventional for protection of natural and synthetic diene rubbers do not protect EPR. However, it was discovered that quinones inhibit degradation of olefin polymers at temperatures as high as 150° C. and also serve as coagents to improve cross-linking efficiency. This aspect of the invention is illustrated in a formula comprising:

|  | Parts by weight |
| --- | --- |
| EP rubber | 100 |
| Carbon black (Philblack O) | 50 |
| Magnesium oxide (Maglite D) | 10 |
| Vulcanizing agent M | 10 |
| Sulfur | 1.0 |
| Antidegradant as coagent | 2.0 |

The compositions are cured 40–60 minutes at 153° C. and then aged 70 hours in a circulating-air oven at 150° C. The physical properties before and after aging are as follows. The control is the aforesaid composition without the antidegradant as coagent.

| Antidegradant or coagent | Modulus of elasticity in lbs./in.$^2$ at 300% elongation | Tensile at break-in, lbs./in.$^2$ | Ultimate elongation, percent | Aged tensile break-in, lbs./in.$^2$ | Aged ultimate elongation, percent |
| --- | --- | --- | --- | --- | --- |
| None | 1,270 | 2,700 | 500 | 520 | 280 |
| p,p'-Dibenzoylquinonedioxime | 1,700 | 3,000 | 470 | 700 | 290 |
| Hexachloro-2-cyclopentenone | 1,450 | 2,800 | 500 | 680 | 270 |
| p-Benzoquinone | 1,120 | 2,800 | 560 | 1,380 | 370 |

It will be noted that both p,p'-dibenzoylquinonedioxime and hexachloro-2-cyclopentenone act as coagents of vulcanization. Both the former and p-benzoquinone improve age resistance.

Effect of other quinones is illustrated in a formulation comprising:

|  | Parts by weight |
|---|---|
| Carbon black (Philblack O) | 50 |
| Magnesium oxide (Maglite D) | 10 |
| Vulcanizing agent M | 10 |
| Sulfur | 1.5 |
| Antidegradant or coagent | 1.5 |

The compositions are cured 20–35 minutes at 153° C. and the vulcanizates aged 70 hours at 150° C. in a circulating-air oven.

| Auxiliary cross-linking agent | Modulus of elasticity in lbs./in.² at 300% elongation | Tensile at break-in, lbs./in.² | Ultimate elongation, percent |
|---|---|---|---|
| None | 150 | 230 | 910 |
| 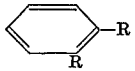 | 210 | 400 | 850 |
| 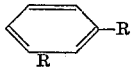 | 650 | 1,440 | 570 |
| 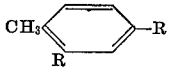 | 660 | 1,460 | 890 |
| R—(CH₂)₆—R | 1,060 | 1,770 | 440 |
| 2,6-dichlorobenzoquinone | 1,680 | 2,430 | 400 |

| Antidegradant or coagent | Modulus of elasticity in lbs./in.² at 300% elongation | Tensile at break-in, lbs./in.² | Ultimate elongation, percent | Aged tensile break-in, lbs./in.² | Aged ultimate elongation, percent |
|---|---|---|---|---|---|
| None (control) | 970 | 2,490 | 590 | 600 | 390 |
| p-Benzoquinone | 950 | 2,500 | 620 | 1,200 | 400 |
| Hydroquinone | 600 | 1,700 | 620 | 950 | 380 |
| Quinhydrone | 780 | 2,300 | 640 | 1,550 | 400 |
| 2,5-dichlorobenzoquinone | 1,000 | 2,400 | 550 | 1,620 | 350 |
| 2,6-dichlorobenzoquinone | 1,180 | 2,600 | 540 | 1,540 | 340 |
| Phenylbenzoquinone | 780 | 2,400 | 660 | 1,040 | 390 |
| 2,3,5,5,6,6-hexachloro-2-cyclohexen-1,4-dione | 940 | 2,400 | 580 | 1,100 | 360 |
| N(2,4-dinitrophenoxy)-p-benzoquinoneimine | 1,200 | 2,300 | 500 | 1,140 | 310 |
| 2,3-dichloro-5,6-dicyano-p-benzoquinone | 1,140 | 2,300 | 540 | 780 | 75 |

It will be noted that hydroquinone increases the age resistance significantly, but the quinones are generally superior, and some of the quinones improved the vulcanizing efficiency.

In general any quinoid compound increases resistance to degradation. The term "quinoid compound" is used in the generic sense to include quinone compounds characterized by the grouping

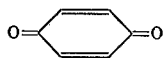

quinoneimines, quinone diimines, and quinone dioximes. These include compounds in which one or both the internal double bonds is saturated by halogen.

Nonsulfur cross-linking agents are useful covulcanizing agents with halogenated cycloalkenyl ketones. A variety of such materials are known and can be used to promote a high degree of cross-linking. Use of these auxiliary cross-linking agents is illustrated in a formulation comprising:

|  | Parts by weight |
|---|---|
| EP Rubber | 100 |
| Carbon black (HAF) | 50 |
| Magnesium oxide | 10 |
| Vulcanizing agent M | 7.5 |
| Auxiliary cross-linking agent | 2.5 |

The stocks are cured at 153° C. for 40 minutes in a press and modulus and tensile properties determined. The auxiliary cross-linking agents designated by formula are bismaleimides where R is

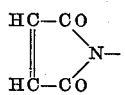

In general, any of the bisdienophiles are useful coagents.

The desired cross-linking takes place in the presence of silica and other fillers used for compounding white stocks. To a base composition of 100 parts by weight of commercially available EP rubber, 10 parts by weight of magnesium oxide, 1 part by weight of sulfur, and 1 part by weight of 2,3,5,6 - tetrachlorobenzoquinone (Chloranil) there is added 50–100 parts by weight of filler and 10 parts by weight of vulcanizing agent J or M or an admixture of equal parts by weight of each. The stocks are cured by heating 20 to 100 minutes at 153° C. to obtain vulcanizates having 300% modulus of 500–900 pounds per square inch. The fillers comprise silicon dioxide (HiSil 233), hydrated sodium silicoaluminate (Zeolex 23), magnesium silicate (Mistron Vapor), and hard kaolin (Dixie Clay).

It was further discovered that saturated rubbery elastomers derived from alpha olefins may advantageously be heated with the halogenated cycloalkenyl ketone in the absence of secondary ingredients which promote a high degree of cross-linking to form a processable reactive polymer and then subsequently adding vulcanizing agent and heating to increase the number of cross links. This procedure has the advantage of producing in the first step a composition which is reactive with conventional rubber vulcanizing agents like sulfur. A composition which has been rendered sulfur-vulcanizable by heating with a halogenated cycloalkenyl ketone, for example, can then be further cured with sulfur and organic rubber accelerator; whereas, if the curing operation is carried out in one step, the presence of accelerator is undesirable. On the other hand, vulcanizates prepared in the absence of accelerator directly from the unmodified rubber are more brittle and less rubbery than those prepared from the reactive polymer by heating with sulfur and accelerator. Also the modified reactive polymer can be cured in the presence of mineral oil, but heating with halogenated ketone in the presence of oil is undesirable because the oil interferes with reaction, probably because the halogenated ketone reacts preferentially with it. Other ingredients desired for one purpose or another in the final composition may react with halogenated ketone; and, therefore, the discovery that a reactive polymer can be produced in a preliminary step is significant. Finally, the sulfur-vulcanizable products produced can be covulcanized with unsaturated rubbers like natural rubber and styrene-butadiene copolymer rubber with which saturated rubbers are not ordinarily covulcanizable.

The modification of the saturated rubber evidently introduces reactive sites and these may be unsaturated sites, but the exact nature of the reaction is unknown. Heating with the vulcanizing agent introduces cross links, but in the absence of other ingredients which promote cross linking, the polymer is still processable with ordinary mixing equipment. It can be milled, mixed with other ingredients including additional vulcanizing agent, molded and cured in a final curing operation which reduces the plastic properties to a point where the stock is no longer processable and which possesses excellent elastic properties.

Reactive polymer forms very quickly upon heating with the halogenated ketone, especially in the presence of a little base like MgO and the reaction may be completed within times of less than a minute or completed over a period of several hours depending upon the conditions. Preferably the reaction is carried out within the range of 200°–450° F. in a Banbury mixer, on a rubber mill, or in an extruder. Short residence times permit use of higher temperatures than would otherwise be feasible.

As an example of preparing a reactive polymer, 100 parts by weight of commercially available EPR, 5 parts by weight of vulcanizing agent M, and 1 part by weight of MgO are mixed on a rubber mill and heated in an electric press for different periods of time at 160° C. Curing ingredients are then added on a mill and the stocks cured under pressure at 160° C. for 40 minutes. The state of cure is evaluated by determining the percent of the cured product soluble in benzene.

| | Minutes of heating | | | | | |
|---|---|---|---|---|---|---|
| | 0 | 6 | 10 | 6 | 6 | 6 |
| Added ingredients | Parts by weight | | | | | |
| Tetramethylthiuram monosulfide | 1.5 | 1.5 | 1.5 | | | |
| 2-mercaptobenzothiazole | 0.5 | 0.5 | 0.5 | | | |
| ZnO | 5 | 5 | 5 | 5 | | |
| Sulfur | 1.5 | 1.5 | 1.5 | 2 | 2 | |
| N,N'(m-phenylene)bismaleimide | | | | | | 5 |
| Percent soluble in benzene | (¹) | 25.1 | 17.1 | 40.8 | 42.7 | 25.3 |

¹ Disintegrated.

In general, saturated plastic polymers derived from alpha olefins can be modified and rendered sulfur-vulcanizable by heating with any of the halogenated vulcanizing agents thereof. Others which may be mentioned are halogenated melamines, as for example trichloromelamine and hexachloromelamine; quinone N-haloimides, as for example p-benzoquinone-N-chloroimide and 2,6 - dichloro-p-benzoquinone-N-chloroimide; and N-halobenzoguanamines, as for example tetrachlorobenzoguanamine. These N-haloimides in contrast to N-bromosuccinimide promote crosslinking of olefin polymers. A preferred reactant for preparing vulcanizable polymers is trichloromethane sulfonyl chloride. Still other suitable halogenated vulcanizing agents are halogenated fulvalene, as for example perchlorofulvalene; chlorohydantoin; per haloaliphatic ether; and halogenated pyrroles. The use of these compounds as vulcanizing agents is described in United States Pats. Nos. 3,128,263, Apr. 7, 1964; 3,136,734, June 9, 1964; and in British Patents Nos. 910,877, 951,023, and 958,623. It will be appreciated that for preparing vulcanizable polymers these adjuvants should consist essentially of the only ingredient reactive with the polymer and should be used in the absence of auxiliary agents promoting a high degree of crosslinking. The proportion of the reactive ingredient is the same as heretofore used for vulcanization. In treating polymers with halogenated cycloalkenyl ketone, the preferred proportion of ketone, whether for preparation of a reactive polymer or for use in conjunction with an auxiliary agent to promote a high degree of crosslinking, is 5–15 parts by weight per 100 parts by weight of polymer. However, lower amounts, as for example 1 part, give significant effect and higher amounts, as for example 30 parts, yield useful products.

The halogenated cycloalkenyl ketones are non-toxic and are easily produced from cheap available raw materials. The chemical structure of all the cycloalkenyl ketones useful in the practice of the invention is not known with certainty. In general, any unsaturated haloketone produced by exhaustive chlorination of a phenolic compound effects the desired modification or vulcanization of saturated rubbers. However, the results obtained are by no means equivalent. The adjuvants selected as illustrative are those which demonstrate the best mode of carrying out the invention. Some of the vulcanizing agents are new chemicals, but all of them may be prepared as indicated. Chlorination of penta- or hexachlorophenol at 120° C. in the presence of antimony pentachloride yields a mixture of octachloroketones, probably 2,3,4, 4,5,5,6,6 - octachloro - 2 - cyclohexen - 1 - one and 2,2,3,4,5,5,6,6 - octachloro - 3 - cyclohexen - 1 - one. Chlorination of pentachlorophenol in acetic acid yields octachloroketone, probably 2,2,3,4,5,5,6,6 - octachloro-3-cyclohexen - 1 - one and 2,3,4,4,5,6 - hexachloro-2,5-cyclohexadien-1-one. The aforesaid compounds are identified in accordance with the infrared analysis of Denivelle and Fort, Bull. Soc. Chim., 459–464 (1958); 392–400 (1959).

Chlorination of 2,2' - thiobis(4,6-dichlorophenol) in acetic acid and continuing the reaction until the combined chlorine is approximately 58% yields chloroketone in the form of a dark orange liquid. Chlorination of 2,2' - methylenebis(4,6 - dichlorophenol) and continuing the reaction until the combined chlorine is 58% yields chloroketone crosslinking agent in the form of a yellow semisolid. Another useful adjuvant is obtained by chlorinating the reaction product of dichlorophenol and formaldehyde. This, too, is a yellow semisolid.

Chlorination of m-cresol yields a tetrachloroketone, melting point 89.5° to 92° C., which is probably 3-methyl-2,4,4,6 - tetrachloro - 2,5 - cyclohexadien - 1 - one. There is also produced a hexachloroketone in the form of white crystals, melting point 116.5°–117° C., which is probably 2,2,4,5,6,6-hexachloro - 3 - methyl - 3 - cyclohexen-1-one. NMR spectra show the presence of a $CH_3$—C group and a CHCl group in 1:1 ratio. The lack of interaction precludes the possibility of the two groups being attached to the same double bond. The IR spectra show that the C=O absorption is shifted to much higher frequency than usual, indicating interaction by at least two chlorine atoms on an adjacent carbon.

Chlorinated nonylphenol yields a ketonic crosslinking agent in the form of a brownish-yellow liquid. Similar conversion of tert-butylphenol by chlorination yields an orange liquid. The chlorination of p-cresol yields a white solid, melting point 105°–108° C., which contains 60.4% chlorine. It is probably 4-methyl-2,3,4,6-tetrachloro-2,5-cyclohexadien-1-one.

Chlorination of 2,6-xylenol yields a white powder containing 60.3% chlorine, which is probably 2,3,4,5,6-pentachloro-2,6-dimethyl-3-cyclohexen-1-one.

Another useful product is obtained by chlorinating 2,5-xylenol to produce a yellow liquid containing 61% chlorine. There is also obtained a white solid, melting point 130°–131° C., which is probably 3,6-dimethyl-2,2,4,5,6-pentachloro-3-cyclohexen-1-one. The chlorination product of 2,4-xylenol containing 55% chlorine is a liquid product as is the chlorination product of 2,3-xylenol containing about 60% chlorine. There is also obtained from 2,3-xylenol white solids. The melting points are 129°–136° C. and 77.5°–79° C., respectively. Chlorinated 3,4-xylenol, containing about 57% chlorine, is a yellow liquid.

Properties of other perhalocyclohexenones useful in the practice of the invention are summarized below:

2,4,5,6,6-pentachloro - 2,3 - dimethyl - 3 - cyclohexen-1-one, M.P. 131°–132° C. (Prepared by chlorination of 4,6-dichloro-2,3-dimethylphenol.)

2,2,3,4,5,6,6-heptachloro-5-methyl-3-cyclohexen-1-one, M.P. 100–101° C. (Prepared by chlorination of tetrachloro-m-cresol in acetic acid-HCl mixture.)

2,3,4,5,6-pentachloro-6-methyl-2,4-cyclohexadien-1-one, M.P. 61° C. (Identified as the pentachloromethyl-cyclohexadienone, M.P. 64°, described Ann. 394, p. 11, 1912.)

2,3,4,5,6,6-hexachloro-2-methyl-3-cyclohexen-1-one, M.P. 102°–103.5° C. (Identified as the hexachloromethyl-cyclohexenone, M.P. 107°, described Ann. 394, p. 10, 1912.)

2,3,4,5,6,6-hexachloro-2,5-dimethyl-3-cyclohexen-1-one, M.P. 94° C. (Prepared by chlorination of trichloro-2,5-dimethylphenol.)

2,2,4,5,6,6-hexachloro-3,5-dimethyl-3-cyclohexen-1-one, M.P. 79°–80° C. (Prepared by chlorination of trichloro-3,5-dimethylphenol.)

2,3,4,5,5,6,6-heptachloro-2-methyl-3-cyclohexen-1-one, M.P. 100°–101° C. (Prepared by chlorination of 2,3,4,5,6-pentachloro-6-methyl-2,4-cyclohexadien-1-one.)

2,4,5,6-tetrachloro-2,3,6-trimethyl-3-cyclohexen-1-one, M.P. 118°–119° C. (Prepared by chlorination of 4-chloro-2,3,6-trimethylphenol.)

2,4,5,6,6-pentachloro-2-methyl-3-cyclohexen-1-one, yellow liquid. (Prepared by chlorination of 2,4-dichloro-6-methylphenol.)

2,2,4,5,6,6-hexachloro-3-cyclohexen-1-one, orange liquid. (Prepared by chlorination of 2,4,6,-trichlorophenol.)

2,2,3,4,5,6,6-heptachloro-3-cyclohexen-1-one, M.P. 95°–96° C. (Prepared by chlorination of 2,3,4,6-tetrachlorophenol.)

The cycloalkenyl ketones containing only one double bond in the ring are preferred. They are more stable in the polymer matrix than the dienes, less sorchy and stronger in vulcanizing strength. The stability of the mono-unsaturated compounds is important where the vulcanizing agent is added to the polymer and the composition is stored prior to effecting vulcanization.

Additional preferred embodiments of the invention from saturated plastic polymers derived from an alpha olefin are prepared from:

chlorinated polyethylene
ethylene-vinyl acetate copolymer
ethylene-vinyl chloride copolymer (50–70% vinyl chloride)
polyvinyl chloride
chlorosulfonated polyethylene, and
copolymer of vinylidene fluoride and hexafluoropropylene.

Cured products are obtained in each instance. Typical compositions and results obtained after curing follow. The chlorinated polyethylene, ethylene-vinyl acetate copolymer, and chlorosulfonated polyethylene employed are all commercial plastic polymers known, respectively, as CPE 500 manufactured by Allied Chemical Company, Levapren 450 containing 55% ethylene and 45% vinyl acetate manufactured by Farbenfabriken Bayer Akt., and Hypalon 30 manufactured by the Du Pont Company.

| Stock | Parts by weight | | |
|---|---|---|---|
| | H | J | K |
| Chlorinated polyethylene | 100 | | |
| Ethylene-vinyl acetate copolymer | | 100 | |
| Chlorosulfonated polyethylene | | | 100 |
| Carbon black | 50 | 50 | 40 |
| Magnesium oxide | 5 | 5 | 10 |
| Sulfur | 1 | 1 | 1 |
| Vulcanizing Agent M | 4 | 4 | 4 |

| Stock | Cure time in minutes | Temperature, °C. | Modulus of elasticity in lbs./in.² at 300% elongation | Tensile at break-in, lbs./in.² | Ultimate elongation, percent |
|---|---|---|---|---|---|
| H | 20 | 153 | 3,190 | 3,440 | 410 |
| J | 40 | 153 | 1,150 | 1,280 | 500 |
| K | 90 | 160 | | 3,040 | 150 |

It was observed by Fisher that 2,3,4,4,5,6-hexachloro-2,5-cyclohexadien-1-one gave a definite, although weak, vulcanizate with rubber, Ind. and Eng. Chem. 31, p. 1385 (1939). Reaction of 2,3,4,4,5,6-hexachloro-2,5-cyclohexadien-1-one with unsaturated rubbers of high functionality is rapid even at mixing temperatures. On the other hand, halogenated cyclohexenones containing a plurality of halogen atoms but only one double bond are much less reactive at ordinary mixing temperatures and at the same time are strong vulcanizing agents for unsaturated rubbers. Relative vulcanizing strength is conveniently evaluated by the Rheometer, supra. Unsaturated rubber compositions are compounded comprising:

| | Parts by weight |
|---|---|
| Unsaturated rubber | 100 |
| Sulfur | 1 |
| Magnesium oxide | 4 |
| Chlorinated vulcanizing agent | 4 |

The compositions are heated at 153° C. in the Rheometer and the maximum torque recorded. A comparison of 2,3,4,4,5,6-hexachloro-2,5-cyclohexadien-1-one, designated CP 267, with Vulcanizing Agent M demonstrates consistently superior vulcanizing activity of Vulcanizing Agent M. All compositions cured in 40 minutes.

| Rubber | Maximum torque with designated vulcanizing agent | |
|---|---|---|
| | CP 267 | Agent M |
| Smoked sheet | 8.3 | 31.2 |
| Styrene-butadiene copolymer rubber (SBR 1500) | 6.2 | 38.8 |
| Cis 4-polybutadiene | 31 | 50.7 |
| Acrylonitrile butadiene copolymer (Hycar 1002) | 21.4 | 31.8 |
| Ethylene-propylene-diene terpolymer | 21.8 | 35 |
| Polychlorobutadiene (Neoprene W) | 37.4 | 66.5 |

The diene hydrocarbon rubbers are curable with certain phenol formaldehyde resins, and the addition of halogenated cycloalkenyl ketone activates resin cures. A typical formulation is 162 parts by weight of styrene-butadiene copolymer rubber (SBR 1606) which contains carbon black, zinc oxide, and stearic acid, 6 parts by weight phenol formaldehyde resin curative (Amberol ST–137), and 2 parts by weight of Vulcanizing Agent M. Gum stock formulations comprise smoked sheet or styrene-butadiene copolymer rubber (SBR 1500) or butyl rubber—100, zinc oxide—5, phenol formaldehyde resin curative—6, and Vulcanizing Agent M—4 parts by weight.

Polyurethane rubbers and silicone rubbers are vulcanizable with halogenated cycloalkenyl ketones. Compositions are compounded from polyurethane rubber (Genthane S manufactured by General Tire and Rubber Company) and from a silicone rubber (Silastic LS 422 manufactured by Dow Corning and described as polymethyltrifluoropropylsiloxane with 16% reinforcing silica.)

|  | Parts by weight | |
| --- | --- | --- |
| Polyurethane rubber | 100 | |
| Silicone rubber | | 100 |
| Magnesium oxide | 5 | 5 |
| Sulfur | 1 | 1 |
| Vulcanizing Agent M | 5 | 5 |

These stocks were cured at 160° C. for the time indicated below:

| Rubber | Cure time in minutes | Modulus of elasticity in lbs./in.$^2$ at 300% elongation | Ultimate Tensile at break-in, lbs./in.$^2$ | Elongation, percent |
| --- | --- | --- | --- | --- |
| Polyurethane | 10 | 250 | 2,440 | 700 |
| Silicone | 30 | 780 | 980 | 340 |

The vulcanizing and modifying agents herein described inhibit growth of bacteria and fungi, and polymers containing them resist attack by microorganisms.

It is intended to cover all changes and modifications of the invention herein chosen for purposes of disclosure which do not constitute departures from the spirit and scope of the invention.

What is claimed is:

1. A process of modifying a saturated plastic polymer of a member selected from the group consisting of an alpha olefin having up to six carbon atoms and styrene an alpha olefin to a sulfur vulcanizable composition which comprises heating within the range of 200–450° F. said polymer having incorporated therein in an amount within the range of 1–30 parts by weight per 100 parts by weight of polymer sufficient to render it sulfur vulcanizable of a halogenated cycloalkenyl ketone comprising at least one six-membered carbocyclic unsaturated ring containing a single keto substituent and a plurality of halogen substituents selected from the group consisting of chlorine and bromine and an auxiliary agent in an amount within the range of 1–10 parts by weight per 100 parts by weight of polymer, said agent selected from the group consisting of a metal oxide, metal hydroxide or metal salt of a weak acid where the metal is selected from a group consisting of magnesium, calcium, zinc, strontium, cadmium, barium, mercury, aluminum, tin, lead, iron, cobalt and nickel.

2. The process of claim 1 wherein the polymer is a saturated rubbery copolymer of ethylene and propylene.

3. The process of claim 1 wherein the ketone is hexachlorocyclohexadienone.

4. The process of claim 1 wherein the ketone is octachlorocyclohexenone.

5. The process of claim 1 wherein the metal compound is magnesium oxide.

6. The process of claim 5 wherein the polymer is polyethylene.

7. The process of claim 1 wherein the polymer is a saturated solid copolymer of ethylene and propylene containing 40% to 75% ethylene by weight and the ketone is hexachloro-2,5-cyclohexadien-1-one.

8. The process of claim 1 wherein the polymer is a saturated solid copolymer of ethylene and propylene containing 40% to 75% ethylene by weight and the ketone is decachlorobicyclohexadienone.

9. The process of claim 1 wherein the polymer is a saturated solid copolymer of ethylene and propylene containing 40% to 75% ethylene by weight and the ketone is octachloro-3-cyclohexen-1-one.

10. A process of vulcanizing a saturated plastic polymer of a member selected from the group consisting of an alpha olefin having up to six carbon atoms and styrene an alpha olefin which comprises heating within the range of 200°–350° F. said polymer having incorporated therein a vulcanizing amount within the range of 1 to 30 parts by weight per 100 parts by weight of polymer of halogenated cycloalkenyl ketone comprising at least one six-membered carbocyclic unsaturated ring containing a single keto substituent and a plurality of halogen substituents selected from the group consisting of chlorine and bromine and an auxiliary agent in an amount within the range of 0.5 to 10 parts by weight per 100 parts by weight of polymer selected from the group consisting of sulfur, metal oxide, metal hydroxide, metal salt of weak acid and mixtures thereof wherein the metal is selected from the group consisting of magnesium, calcium, zinc, strontium, cadmium, barium, mercury, aluminum, tin, lead, iron, cobalt and nickel.

11. The process of claim 10 wherein the auxiliary agent is sulfur.

12. The process of claim 10 wherein the auxiliary agent is magnesium oxide.

13. The process of claim 10 wherein the auxiliary agent is a mixture of magnesium oxide and sulfur.

14. The process of claim 10 wherein the polymer is polyethylene.

15. The process of claim 10 wherein the polymer is a saturated solid copolymer of ethylene and propylene, the halogen is chlorine, the ratio of the number of chlorine atoms to number of carbon atoms in the ring is at least one, and the auxiliary agent is sulfur.

16. The process of claim 10 wherein the polymer is a saturated solid copolymer of ethylene and propylene containing 40% to 75% ethylene by weight, the halogen is chlorine, the ratio of the number of chlorine atoms to number of carbon atoms in the ring is at least one, and the auxiliary agent is a mixture of sulfur and oxide of a divalent metal.

17. The process of claim 10 wherein the auxiliary agent is sulfur and the polymer contains an antidegradant amount of a member selected from the group consisting of hydroquinone and quinone compounds.

18. The process of vulcanizing a saturated plastic polymer of a member selected from the group consisting of an alpha olefin having up to six carbon atoms and styrene an alpha olefin which comprises heating said copolymer within the range of 200°–350° F. having incorporated therein a vulcanizing amount within the range of 1–30 parts by weight per 100 parts by weight of polymer of chlorinated cycloalkenyl ketone, the ratio of number of chlorine atoms to number of carbon atoms in the ring being at least one, comprising at least one six-membered carbocyclic unsaturated ring containing a single keto substituent and a covulcanizing and antidegradant amount of a quinone compound.

19. The process of claim 18 wherein the polymer is a saturated solid copolymer of ethylene and propylene.

20. The process of claim 18 wherein the ketone is octachlorocyclohexenone.

21. The process of claim 18 wherein the ketone is hexachloromethylcyclohexenone.

22. The process of claim 18 wherein the polymer is polyethylene.

23. A composition comprising a saturated plastic polymer of a member selected from the group consisting of an alpha olefin having up to six carbon atoms and styrene an alpha olefin having incorporated therein a vulcanizing amount within the range of 1–30 parts by weight per 100 parts by weight of polymer of a halogenated cycloalkenyl ketone comprising at least one six-membered carbocyclic unsaturated ring containing a single keto substituent and a plurality of halogen substituents selected from the group consisting of chlorine and bromine and an auxiliary agent in an amount within the range of 0.5 to 10 parts by weight per 100 parts by weight of polymer selected from the group consisting of sulfur, metal oxide, metal hydroxide, metal salt of weak acid and mixtures thereof wherein the metal is selected from the group consisting of magnesium, calcium, zinc, strontium, cadmium, barium, mercury, aluminum, tin, lead, iron, cobalt and nickel.

24. A composition of claim 23 wherein the polymer is polyethylene.

25. A composition of claim 23 wherein the ketone is octachlorocyclohexenone.

26. A composition of claim 25 wherein the polymer is polyethylene.

27. A composition of claim 25 wherein the polymer is chlorinated lower polyalkylene.

28. A composition of claim 25 wherein the polymer is ethylene-vinyl acetate.

29. A composition of claim 25 wherein the polymer is ethylene-vinyl chloride.

References Cited
UNITED STATES PATENTS

| | | | |
|---|---|---|---|
| 3,332,892 | 7/1967 | Middleton | 260—2.5 |
| 3,361,719 | 1/1968 | Blümel et al. | 260—66 |

WILLIAM H. SHORT, Primary Examiner

L. M. PHYNES, Assistant Examiner

U.S. Cl. X.R.

260—45.7, 45.8, 87.3, 87.5, 94.9